United States Patent [19]

Weerackody

[11] Patent Number: 5,305,353

[45] Date of Patent: Apr. 19, 1994

[54] METHOD AND APPARATUS FOR PROVIDING TIME DIVERSITY

[75] Inventor: Vijitha Weerackody, Springfield, N.J.

[73] Assignee: AT&T Bell Laboratories, Murray Hill, N.J.

[21] Appl. No.: 890,977

[22] Filed: May 29, 1992

[51] Int. Cl.$^5$ .................... H04B 7/10; H04L 1/02; H04L 27/28; H04K 1/10
[52] U.S. Cl. .................... 375/100; 375/38; 375/40; 375/67
[58] Field of Search ............ 345/38, 40, 67, 100; 455/59, 52.1, 52.2, 52.3, 132, 101, 103

[56] References Cited

U.S. PATENT DOCUMENTS 3,267,380  8/1966  Adams.
3,348,150  10/1967 Atal et al.
3,662,268  5/1972  Gans et al.
3,717,814  2/1973  Gans.

OTHER PUBLICATIONS

H. Iwai et al., "A Fading Reduction Technique Using Interleave-Aided Open Loop Space Diversity for Digital Maritime-Satellite Communications," *IEICE Transactions on Communications Electronics Information and Systems*, 3286–3294, vol. E74, No. 10 (Oct. 1991).

A. Hiroike et al. "Combined Effects of Phase Sweeping Transmitter Diversity and Channel Coding", IEEE Transactions on Vehicular Technology, vol. 41, No. 2 (May 1992), 170–176.

N. Seshadri and C-E. W. Sundberg "Multi-Level Block Coded Modulations for the Rayleigh Fading Channel", GLOBECOM 1991, 0047–0051 (1991).

D. G. Brennan "Linear Diversity Combining Techniques", Proc. IRE, vol. 47, 1075–1102 (Jun. 1959).

J. Hagenauer et al. "The Performance of Rate-Compatible Punctured Convulutional Codes for Digital Mobile Radio", IEEE Transactions on Communications, vol. 38, No. 7, 966–980 (Jul. 1990).

C-E. W. Sundberg and N. Seshadri "Digital Cellular Systems for North America", Proc. GLOBECOM 1990, 533–537 (Dec. 1990).

E. J. Baghdady "Theory of Frequency Modulation by Synthetic Antenna Motion", IEEE Transactions on Communications, vol. 39, No. 2, 235–248 (Feb. 1991).

E. Lutz "Code and Interleaver Design for Data Transmission Over Fading Channels", Proc. GLOBECOM 1984, 381–386 (Nov. 1984).

*Primary Examiner*—Curtis Kuntz
*Assistant Examiner*—Duane Kobayashi
*Attorney, Agent, or Firm*—Thomas A. Restaino

[57] ABSTRACT

The invention provides a method and apparatus for transmitting digital signal information to a receiver using a plurality of antennas. The invention involves applying a channel code to a digital signal producing one or more symbols. A plurality of symbol copies is made and each copy is weighted by a distinct time varying function. Each antenna transmits a signal based on one of the weighted symbol copies. Any channel code may be used with the invention, such as a convolutional channel code or block channel code. Weighting provided to symbol copies may involve application of an amplitude gain, phase shift, or both. The present invention may be used in combination with either or both conventional interleavers and constellation mappers.

34 Claims, 2 Drawing Sheets

METHOD AND APPARATUS FOR PROVIDING TIME DIVERSITY

FIELD OF THE INVENTION

The present invention relates generally to the field of communications systems, and particularly to the field of wireless communications, such as, e.g., cellular radio.

BACKGROUND OF THE INVENTION

In wireless communication systems, an information signal is communicated from a transmitter to a receiver via a channel comprising several independent paths. These paths are referred to as multipaths. Each multipath represents a distinct route an information signal may take in traveling between the transmitter and receiver. An information signal communicated via such a channel—a multipath channel—appears at a receiver as a plurality of multipath signals, one signal for each multipath.

The amplitudes and phases of signals received from a transmitter through different multipaths of a channel are generally independent of each other. Because of complex addition of multipath signals, the strength of received signals may vary between very small and moderately large values. The phenomenon of received signal strength variation due to complex addition of multipath signals is known as fading. In a fading environment, points of very low signal strength, or deep fades, are separated by approximately one-half of a signal wavelength from each other.

Wireless communication channels can be described by certain channel characteristics, such as amplitude attenuation and phase shifting. For example, the multipaths of a channel may provide different amplitude attenuations and phase shifts to an information signal communicated from a transmitter to a receiver. These different amplitude and phase characteristics may vary due to e.g., relative movement between transmitter and receiver, or changes in local geography of the transmitter or receiver due to movement. Because of the variation of channel characteristics, a receiver can experience a signal whose strength varies with time. This variation is the manifestation of the complex addition of multipath signals having time varying amplitudes and phases.

If the characteristics of a multipath channel vary slowly, a receiver experiencing a deep fade may observe a weak signal for a long period of time. Long fades are not uncommon in, e.g., indoor radio systems, where relative movement between receivers and transmitters is slow or nonexistent (often, one of these two is an immobile base station; the other is a mobile device carried by a person). Since the duration of a deep fade in an indoor radio system may be large in comparison to the duration of information symbols being communicated, long bursts of symbol errors may occur (due to the weakness of received signal strength for an extended period of time).

Space diversity is a classical technique for mitigating the detrimental effects of fading, such as error bursts. Space diversity is provided through the use of a plurality of antennas at a receiver. If the receiver antennas are separated by more than a couple of wavelengths, the multipath signals received by the individual receiver antennas are approximately independent of each other. When several antennas are used by a receiver, the probability that received signals will yield a deep fade at all antennas simultaneously is small. Thus, signals received by these antennas may be combined to reduce the effects of fading.

Space diversity, however, is not without its drawbacks. For example, space diversity requires the use of a plurality of widely spaced antennas. For small portable receivers this requirement is problematic. Also, space diversity increases the complexity of a receiver, thereby increasing its cost.

Time diversity is another technique which has been employed to mitigate the detrimental effects of fading. Time diversity may be achieved by transmitting a plurality of copies of an information signal during distinct time intervals. These transmission time intervals should be separated in time so that received signals are subjected to independent fades. Once the plurality of signal copies have been received by a receiver, the independent nature of their fades facilitates avoidance of the detrimental effects of fading.

Like space diversity, time diversity also has its drawbacks. Time diversity is predicated on the idea of identical signal transmission at different times. However, the time needed to receive a plurality of copies of an information signal presents a delay in the communication process which may be undesirable, if not intolerable.

Time diversity can also be effectively obtained when a channel code is used in conjunction with an interleaver/deinterleaver pair well known in the art. An interleaver receives a set of consecutive channel coded data symbols for transmission and rearranges them in, e.g., a pseudorandom fashion. Typically, the number of symbols in the set extend for a duration beyond that of a slow deep fade. Rearranged symbols are transmitted over the channel to a receiver having a single antenna. By virtue of transmission, consecutive symbols are subject to similar fading. However, these consecutively transmitted symbols are not in original order. A receiver equipped with a deinterleaver rearranges the symbols back to their original order. Due to the randomness of their transmission order, data symbols presented to the channel decoder by the deinterleaver have been subject to essentially independent fades. The independent symbol fading afforded by the interleaver/deinterleaver pair may be utilized to avoid fading's detrimental effects.

However, as with the first time diversity technique discussed above, a transmission delay is created by this approach. This delay is directly proportional to the size of the interleaver. Allowable transmission delay imposes limits on the size of the interleaver. However, an interleaver of a size beyond the imposed limit may be needed to deal effectively with fading.

SUMMARY OF THE INVENTION

The present invention provides a method and apparatus for mitigating the detrimental effects of fading. It does this by effectively varying the characteristics of a multipath communication channel to provide a time diversity with a reduced delay effect.

A first illustrative embodiment of the present invention provides time diversity by increasing the rate of multipath channel fading. The embodiment further provides information redundancy through use of a channel code. The increased fading rate shortens the duration of fades so as to facilitate avoidance of long error bursts. The redundancy introduced by the channel code helps mitigate errors which may occur due to fading. The embodiment provides a channel coder for applying the channel code to a digital information signal. The channel coder produces one or more coded information symbols which are processed by a constellation mapper. A copy of each symbol is then provided to a plurality of M multipliers. Each multiplier is associated with one of M antennas. The multipliers weight the copies of the symbol with M distinct time varying functions. Illustratively, each of these time varying functions provides a distinct phase offset to a copy of a symbol. The output of each multiplier is provided to its associated antenna for transmission to a receiver. The multiple distinctly weighted copies of a symbol are transmitted substantially simultaneously. The receiver for use with this embodiment comprises a single antenna for receiving the weighted symbols and a channel decoder which is complementary to the channel encoder.

A second illustrative embodiment of the present invention employs a particular kind of channel code, referred to as a block code. Like the first embodiment, this embodiment employs multipliers such as those described above to weight each of M copies of a block coded symbol, this time with a distinct discrete phase shift. Each weighted copy is provided for transmission to a receiver by an antenna. As with the first embodiment, a receiver for use with this embodiment comprises a single antenna for receiving the weighted symbols and a channel decoder which is complementary to the channel encoder.

DETAILED DESCRIPTION

Introduction to the Illustrative Embodiments

The illustrative embodiments of the present invention concern a wireless communication system such as, e.g., an indoor radio communication system, a cellular system, or personal communications system. In such systems, a base station commonly uses a plurality of antennas (e.g., two) for receiving transmitted signals. This plurality of antennas provides the base station with space diversity. According to the principles of the present invention, a plurality of antennas at the base station should be used for the transmission of signals to the mobile units. Advantageously, the same plurality of antennas used for base station reception may be used for transmission to the mobile units. These mobile units employ but one antenna.

Consider, for example, an indoor radio system comprising a base station having two antennas, $T_1$ and $T_2$, for transmitting a channel coded signal in, for example, a Rayleigh fading channel (that is, a channel without a line-of-sight path between transmitter and receiver) and a mobile receiver. In such a system, the typical delay spread between received multipath symbols is on the order of several nanoseconds—a very small spread in comparison to the duration of a channel code symbol.

Figure 1A:
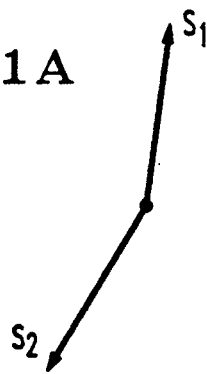
FIGS. 1a and 1b presents two signal phasors from two transmitting antennas at specific points in space where deep fades occur.
Figure 1B:
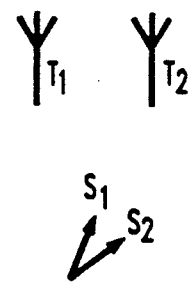

FIG. 1 depicts received signal phasors $S_1$ and $S_2$, from antennas $T_1$ and $T_2$, at specific points in space where a deep fade can occur. The signals $S_1$ and $S_2$ are independently and identically distributed with, e.g., Rayleigh amplitude and uniform phase. Furthermore, the characteristics of the channel through which phasors $S_1$ and $S_2$ are communicated change slowly, so that the deep fades depicted in FIG. 1 are essentially static. The deep fades at the locations corresponding to FIG. 1(a) occur because of destructive addition of the signals from the two base station antennas. The deep fades shown in FIG. 1(b) occur because of the weakness of received signal energy from each individual antenna $T_1$ and $T_2$.

The first illustrative embodiment of the present invention introduces very small time varying phase offsets $\theta_1(n)$ and $\theta_2(n)$ to the signals transmitted at antennas $T_1$ and $T_2$, respectively. These offsets have the effect of a slow rotation of the phasors $S_1$ and $S_2$. If $\theta_1(n)$ and $\theta_2(n)$ take on different values, $S_1$ and $S_2$ will destructively interfere with each other only for a small fraction of time. If a channel code is employed, this technique can be used to reduce the deep fades shown in FIG. 1(a).

The first illustrative embodiment may be extended to deal with the deep fades presented in FIG. 1(b). All that is required is the use of additional transmitting antennas to help contribute to received signal strength. A discussion of the embodiment below is generic to the number of transmitting antennas, M.

Like the first illustrative embodiment, the second illustrative embodiment introduces phase offsets prior to signal transmission. In the second embodiment, a particular type of channel code—a block code—is used. Given the use of this code, the phases of signals transmitted from base station antennas are shifted to take on a set of discrete values which depend on the number of antennas, M, and the length of a block code codeword, N.

As with the first illustrative embodiment, this embodiment addresses both types of deep fades presented in FIG. 1, with the deep fade shown in FIG. 1(b) addressable by extension to a larger number of transmitting antennas. A disclosure of this embodiment is also generic to the number of antennas provided, M, and the number of symbols in a codeword, N.

For clarity of explanation, the illustrative embodiments of the present invention are presented as comprising individual functional blocks. The functions these blocks represent may be provided through the use of either shared or dedicated hardware, including, but not limited to, hardware capable of executing software. Illustrative embodiments may comprise digital signal processor (DSP) hardware, such as the AT&T DSP16 or DSP32C, and software performing the operations discussed below. Very large scale integration (VLSI) hardware embodiments of the present invention, as well as hybrid DSP/VLSI embodiments, may also be provided.

A First Illustrative Embodiment

Figure 2:
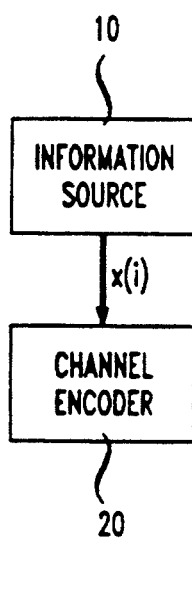
FIG. 2 presents a first illustrative embodiment of the present invention.

A first illustrative embodiment of the present invention is presented in FIG. 2. The embodiment is a radio communication system base station transmitter for use in, e.g., cellular radio and other types of personal communications systems. The transmitter comprises a channel coder 20, a DPSK modulator 30, a plurality of multiplication circuits 50, transmission circuitry 52 (comprising conventional carrier, pulse shaping, and power amplification circuits), and a plurality of transmitting antennas 55.

Channel coder 20 may be any of the conventional channel coders well known in the art. These include convolutional or block codes, e.g., a rate one-half memory 3 convolutional code. Coder 20 provides a channel code to a pulse code modulated digital information signal, x(i), representing, e.g., speech. Signal x(i) is provided by a conventional information source 10 such as, e.g., an ordinary telephone network, coupled to the base station transmitter, providing signals to be transmitted to a mobile receiver or, more simply, a microphone, audio front-end circuitry, and an analog-to-digital converter in combination. It will be apparent to one of ordinary skill in the art that the present embodiments may be used with any information source which provides or may be adapted to provide digital data.

Output from channel coder 20 are complex data symbols, a(n), where $a(n) = a_r(n) + j\, a_i(n)$ and n is a discrete time index; illustratively, $a_r(n), a_i(n) \in \{-1, 1\}$ (the discrete time index i has been changed to n to reflect the fact that the time indices for information bits and channel coded symbols may not coincide). Each such symbol, a(n), is provided to a conventional 4-DPSK constellation mapper 30 well known in the art. Constellation mapper 30 comprises a conventional Gray coded 4-PSK constellation mapper, a multiplier 35, and a unit delay register 37. It will be further apparent to one of ordinary skill in the art that any conventional constellation mapper, or no constellation mapper at all, may be used with these embodiments.

The 4-PSK constellation mapper 30 processes complex data symbols a(n) received from channel coder 20 as follows:

$$\alpha(n) = e^{ja_r(n)\frac{\pi}{2} - a_i(n)\frac{\pi}{4})e^{-j\frac{\pi}{4}}} \quad (1)$$

The Gray coded 4-PSK complex symbols, $\alpha(n)$, are provided to multiplication circuit 35 where they are multiplied by the output of unit delay register 37 as follows:

$$u(n) = \alpha(n)u(n-1). \quad (2)$$

The results of the operation of the multiplication circuit 35 and delay register 37 are complex 4-DPSK coded symbols, u(n). This embodiment provides one complex 4-DPSK symbol, u(n), for each complex symbol, a(n), provided by the channel coder 20. Each such symbol, u(n), is provided in parallel to a plurality of M multiplication circuits 50, transmission circuitry 52, and transmitting antennas 55. Illustratively, M=2.

Each multiplication circuit 50 multiplies a complex symbol, u(n), provided by constellation mapper 30, by a complex time-varying function of the form $A_m(n)e^{j\theta_m(n)}$, where m indexes the plurality of M antennas, $A_m(n)$ is an amplitude weight for the mth antenna, and $\theta_m(n)$ is a phase offset for the mth antenna. Illustratively, $$A_m(n) = \frac{1}{\sqrt{M}} \quad (3)$$

-continued $$\theta_m(n) = 2\pi f_m n T_d.$$

where $f_m = f_\Delta[(m-1) - \frac{1}{2}(M-1)]$; $T_d$ is the reciprocal of the transmitted symbol data rate; and $f_\Delta$ is a small fraction of the transmitted symbol date rate, e.g., 2% thereof. So, for example, if the data symbol rate is 8 kilosymbols/second, $T_d = 0.125$ ms and $f_\Delta = 160$ Hz (symbols/second).

What results from the operation of multipliers 50 are a plurality of complex symbols, $c_m(n)$, each provided to conventional transmission circuitry 52 and an antenna 55. Signals reflecting symbols $c_m(n)$ are transmitted substantially simultaneously by antennas 55 to a conventional single antenna receiver equipped with a channel decoder (complementary to channel coder 20). Thus, the first illustrative embodiment provides for parallel transmission of data symbols by a plurality of M antennas and wherein each symbol is multiplied prior to transmission by a unique complex function.

Figure 3:
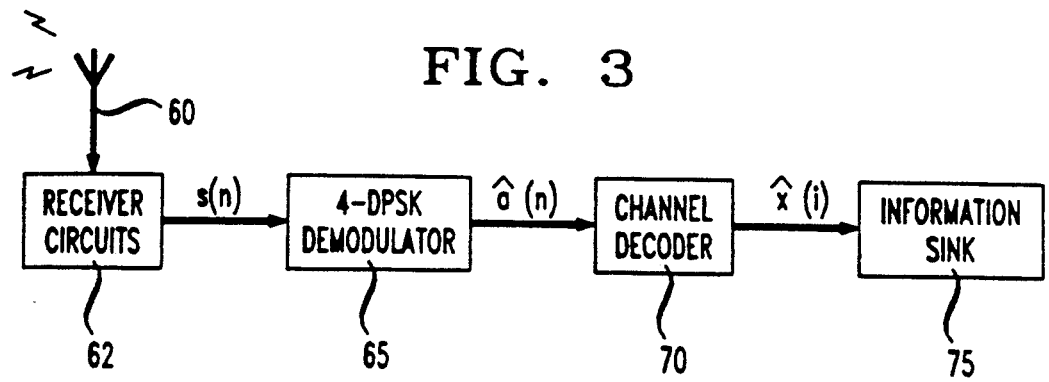
FIG. 3 presents a receiver for use with the first illustrative embodiment.

FIG. 3 presents an illustrative conventional receiver for use with the first illustrative embodiment presented in FIG. 2. The receiver comprises an antenna 60 and conventional front-end receiver circuitry 62 (comprising, e.g., low noise amplifiers, RF/IF band-pass filters, and a match filter) for receiving a transmitted signal, s(n), from the transmitting antennas 55. Signal s(n) is given by the following expression:

$$s(n) = \sum_{m=1}^{M} A_m(n)e^{j\theta_m(n)}\beta_m(n)u(n) + v(n) \quad (4)$$

where M is the total number of transmitting antennas 55, $A_m(n)$ and $\theta_m(n)$ are as described above, $\beta_m(n)$ represents the complex fading on each of M multipath channels, u(n) is as described above, and v(n) is a complex additive white Gaussian noise component (of course, expression (4) is merely a model for a signal actually received by the receiver; no calculation of expression (4) is needed for purposes of the present invention).

Signal s(n) is provided to a 4-DPSK demodulator 65. The output of the 4-DPSK demodulator 65, â(n), is an estimate of the output of the channel encoder 20 of the transmitter (the " ^ " indicating an estimated value). Demodulator 65 provides â(n) according to the following expression:

$$\hat{a}(n) = s(n)s^*(n-1)e^{j\frac{\pi}{4}}, \quad (5)$$

where $s^*$ indicates the complex conjugate of s. Complex symbol â(n) is then provided to conventional channel decoder 70 (complementary to channel coder 20) which provides a decoded information signal estimate, x̂(i). Information signal estimate, x̂(i), is provided to information sink 75 which makes use of the information in any desired manner, such as, e.g., digital-to-analog conversion, amplification and application to a transducer such as a loudspeaker.

Figure 4A:
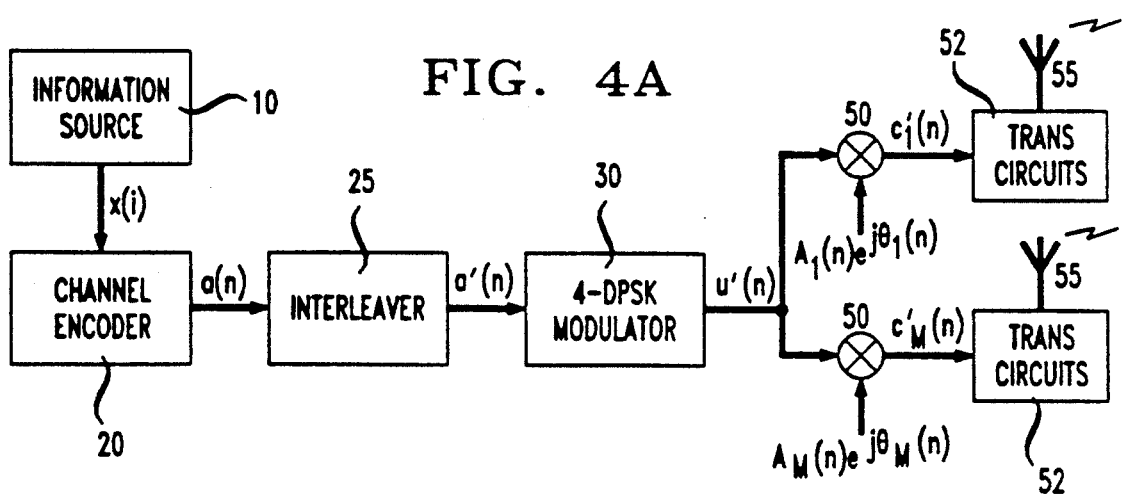
FIGS. 4a and b present the illustrative embodiments of FIGS. 2 and 3 augmented to include an interleaver/deinterleaver pair, respectively.
Figure 4B:
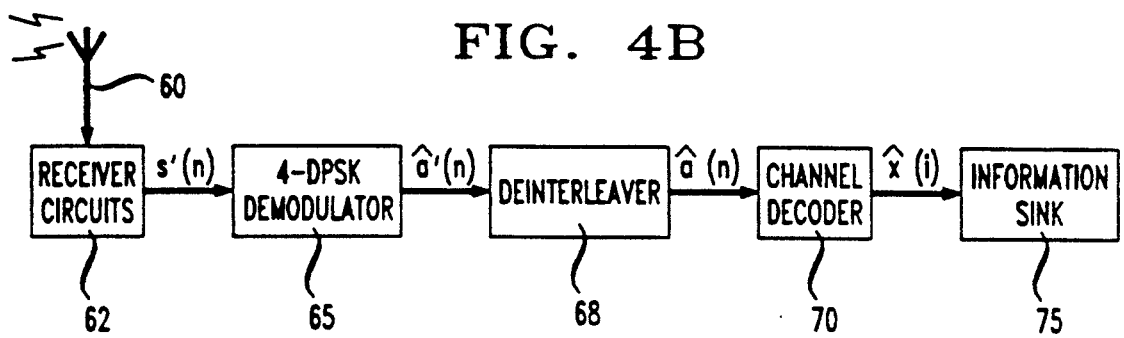

The first illustrative embodiment of the present invention may be augmented to include a conventional interleaver/deinterleaver pair. See FIG. 4a and b. As noted previously, use of an interleaver/deinterleaver pair in conventional slowly fading systems can result in large transmission delays. This is because to be useful, an interleaver must operate on many symbols (i.e., a number of symbols which when multiplied by the reciprocal of the symbol data rate yields a duration far in excess of the duration of an expected fade). For example, assuming a convolutional channel code, the interleaver operates on a number of samples equal to ten times the duration of an expected fade. Thus, a conventional deinterleaver must wait to receive all such symbols before deinterleaving can occur. This causes delay.

By virtue of the faster fading provided by the first illustrative embodiment of present invention, a smaller interleaver/deinterleaver pair may be used, resulting in enhanced performance with less delay than that associated with slowly fading channels.

The first illustrative embodiment of the present invention may be advantageously combined with conventional multiple antenna receivers providing space (or antenna) diversity. All that is required of the receiver is that it employ a channel decoder which is complementary to that used in the transmitter.

A Second Illustrative Embodiment

Figure 5:
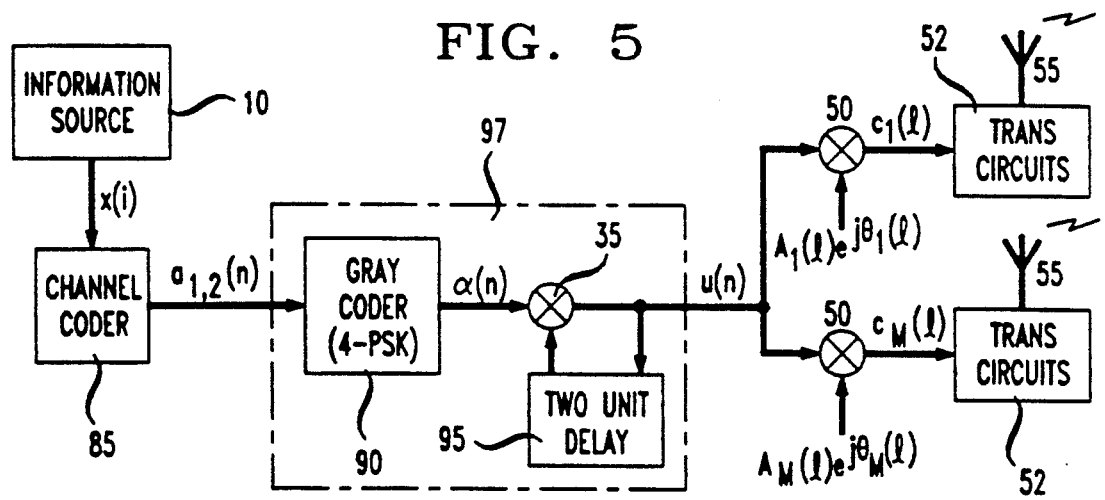
FIG. 5 presents a second illustrative embodiment of the present invention.

The second illustrative embodiment of the present invention is presented in FIG. 5. As with the first illustrative embodiment of the present invention, an information source 10 presents a digital information signal, x(i), for transmission to a receiver. The channel coder 85 provides an illustrative block code—e.g., a conventional one-half rate repetition code with block length $N=2$. The repetition code provided by the channel coder 85 produces a code symbol $d(n) \in \{-1, 1\}$. This symbol is repeated such that the output from coder 85 at time n comprises two symbols, $a_1(n)$ and $a_2(n)$, both of which are equal to symbol d(n).

The coded symbols, $a_1(n)$, $a_2(n)$, are mapped to a 4-PSK constellation using a Gray coder 90. The output of Gray coder 90 is provided according to the following expressions:

$$a(n) = e^{ja1(n+1)(\frac{\pi}{2}) - a1(n)\frac{\pi}{4}) - j\frac{\pi}{4}};  \quad (6)$$

$$a(n+1) = e^{ja2(n+1)(\frac{\pi}{2}) - a2(n)\frac{\pi}{4}) - j\frac{\pi}{4}}.  \quad (7)$$

This output, $a(n)$, is provided to multiplier 35 where it is weighted by the output of two symbol unit delay 95. This weighting provides 4-DPSK constellation mapping 97 according to the following expression:

$$u(n) = a(n)u(n-2).  \quad (8)$$

The result of 4-DPSK constellation mapping, u(n), is provided to a plurality of $M=2$ multipliers 50, transmission circuitry 52, and associated antennas 55.

As a general matter, for a block code wherein each codeword comprises N symbols (with time indices given by n, n+1, ..., n+N−1), each multiplier provides a phase shift, $\theta_m$, for the signals to be transmitted at the mth antenna. For up to the first M symbols of a codeword, the phase shift $\theta_m$ applied by the mth multiplier is:

$$\theta_m(l) = \frac{2\pi}{M}(m-1)(l-n),  \quad (9)$$

for $n \leq l \leq (n + M - 1)$.

For any symbols of a codeword exceeding M (i.e., $M < N$), the phase shift $\theta_m$ applied by the mth multiplier is:

$$\theta_m(l) = \frac{2\pi}{kM}(m-1)(l-M-n+n'+1),  \quad (10)$$

for $n + M \leq l \leq (n + N - 1)$, where l is a time index and k and n' are integers which satisfy the following expressions:

$$(k-1)M + 1 \leq N \leq kM \text{ and}$$

$$n'(k-1) < (l-M-n+1) \leq (n'+1)(k-1).  \quad (11)$$

This phase shift technique provides M uncorrelated symbols and N-M partially decorrelated symbols. As with the first embodiment of the present invention, this embodiment may be augmented with a conventional interleaver/deinterleaver pair. In this case, the interleaver/deinterleaver pair operates to further decorrelate the N-M partially decorrelated transmitted symbols.

For the above second illustrative embodiment, the first multiplier 50 provides a phase shift $\theta_1(n) = \theta_1(n+1) = 0$, while the second multiplier 50 provides a phase shift $\theta_2(n) = 0$ and $\theta_2(n+1) = \pi$. Each of these multipliers provides an amplitude $A_m(l)$ of unity. The signal received by a receiver, s, will be of the form:

$$s(n) = (\beta_1(n) + \beta_2(n))u(n) + v(n)$$

$$s(n+1) = (\beta_1(n+1) - \beta_2(n+1))u(n+1) + v(n+1)  \quad (12)$$

where $\beta_1(n)$ and $\beta_2(n)$ are the complex fading coefficients, $\omega_c$ is the carrier frequency, T is the sampling interval, and v(n) is the additive white Gaussian noise component. The fading coefficients $\beta_1(n)$ and $\beta_2(n)$ are independently and identically distributed complex Gaussian random variables with mean equal to zero.

The complex envelope of the received signal, s, is $$r(n) = (\beta_1(n)e^{j\theta_1(n)}\beta_2(n)e^{j\theta_2(n)}).  \quad (13)$$

For this embodiment, values r(n) and r(n+1) are completely uncorrelated.

Figure 6:
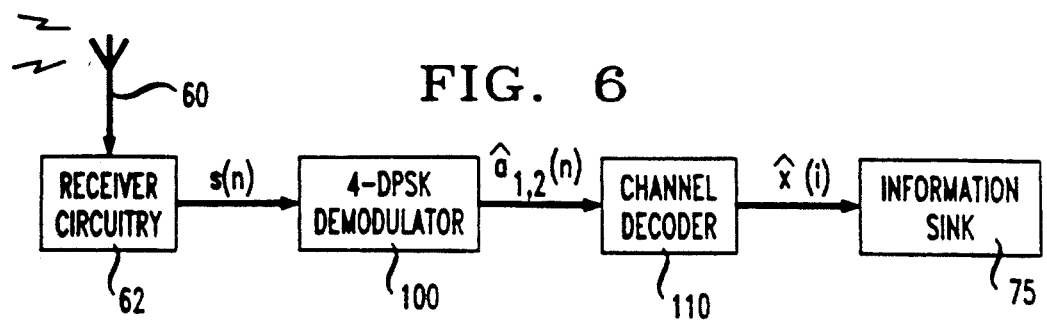
FIG. 6 presents a receiver for use with the second illustrative embodiment.

FIG. 6 presents an illustrative receiver for use with the second illustrative embodiment presented in FIG. 5. The receiver comprises an antenna 60 and conventional front-end receiver circuitry 62 for receiving a transmitted signal, s(n), from the transmitting antennas 55. Signal s(n) is given by (12).

Signal s(n) is provided to the 4-DPSK demodulator 100. The output of the 4-DPSK demodulator 100, $\hat{a}_{1,2}(n)$, is an estimate of the output of the channel encoder 85 of the transmitter (the ' ^ ' indicating an estimated value). Demodulator 100 provides z(n) according to the following expression:

$$z(n) = s(n)s^*(n-2)e^{j\frac{\pi}{4}}.  \quad (14)$$

where s* indicates the complex conjugate of s. Complex symbol z(n) is further processed by demodulator 100 to provide values for $\hat{a}_{1,2}(n)$ as follows:

$$\hat{a}_1(n) = Re\{z(n)\};$$

$$\hat{a}_1(n+1) = Im\{z(n)\};$$

$$\hat{a}_2(n) = Re\{z(n+1)\};$$

$$\hat{a}_2(n+1) = Im\{z(n+1)\}. \quad (15)$$

Values of $\hat{a}_{1,2}(n)$ are then provided to channel decoder 110 (complementary to channel coder 85) which provides a decoded information signal estimate, $\hat{x}(i)$ by (i) forming a value $U(n) = \hat{a}_1(n) + \hat{a}_2(n)$; (ii) determining $\hat{a}(n)$ as follows:

$$U(n) > 0 \hat{d}(n) = 1$$

$$U(n) < 0 \hat{d}(n) = -1; \quad (16)$$

and (iii) conventionally decoding $\hat{d}(n)$ to provide $\hat{x}(i)$. Information signal estimate, $\hat{x}(i)$, is provided to information sink 75 which makes use of the information in any desired manner.

The above discussion of the second embodiment includes an example where N,M=2. The generality of equations (9)-(11) may further be seen when N>M. For example, assuming, N=4 and M=2, the first multiplier 50 provides no phase shift (i.e., u(n) multiplied by unity), and the second multiplier provides phase shift for each block of $\theta_2(n)=0$; $\theta_2(n+1)=\pi$; $\theta_2(n+2)=\pi/2$; and $\theta_2(n+3)=3\pi/2$. In this case, the signal received by a receiver, s, will be of the form:

$$s(n) = (\beta_1(n) + \beta_2(n))u(n) + v(n)$$

$$s(n+1) = (\beta_1(n+1) - \beta_2(n+1))u(n+1) + v(n+1)$$

$$s(n+2) = (\beta_1(n+2) + j\beta_2(n+2))u(n+2) + v(n+2)$$

$$s(n+3) = (\beta_1(n+3) - j\beta_2(n+3))u(n+3) + v(n+3) \quad (17)$$

The complex envelope of the received signal is $$r(n) = (\beta_1(n)e^{j\theta_1(n)} + \beta_2(n)e^{j\theta_2(n)}). \quad (18)$$

According to this particular embodiment (where N=4 and M=2), r(n) and r(n+1) are uncorrelated as are r(n+2) and r(n+3). Values r(n+2) and r(n+3) are partially decorrelated from r(n) and r(n+1). Use of a conventional interleaver/deinterleaver pair will render all four of these values approximately uncorrelated. In a very slow fading channel in the absence of phase variations provided in accordance with the present invention, all four of these values, r(n), r(n+1), r(n+2), and r(n+3), will be highly correlated and will require an interleaver of large dimension. By use of the present embodiment, only two of the four values need decorrelation by operation of an interleaver. Thus, the delay due to interleaving may be reduced by more than a factor of two.

I claim:

1. A method of transmitting digital signal information to a receiver with use of a plurality of M antennas, the method comprising the steps of:
   applying a channel code to a digital signal to produce one or more symbols;
   forming M copies of a symbol;
   weighting each of the M copies of the symbol with a distinct time varying function to form M weighted symbol copies; and
   substantially simultaneously transmitting M signals with M different antennas, each transmitted signal based on a distinct one of the M weighted symbol copies.

2. The method of claim 1 wherein the step of applying a channel code comprises the step of applying a convolutional code.

3. The method of claim 1 wherein the step of applying a channel code comprises the step of applying a block code.

4. The method of claim 1 wherein each time varying function provides an amplitude gain to a symbol.

5. The method of claim 4 wherein the amplitude gain is $$\frac{1}{\sqrt{M}}.$$

6. The method of claim 1 wherein each time varying function provides a phase shift to a symbol.

7. The method of claim 6 wherein a phase shift applied to symbols is based upon a transmitted symbol data rate.

8. The method of claim 6 wherein a phase shift applied to an nth symbol for the mth antenna is $$2\pi f_\Delta \left[ (m-1) - \frac{1}{2}(M-1) \right] nT_d,$$

wherein $f_\Delta$ is a fraction of a transmitted symbol data rate and $T_d$ is a reciprocal of the transmitted symbol data rate.

9. The method of claim 6 wherein a phase shift, $\theta_m(l)$, applied to an nth symbol for the mth antenna is $$\frac{2\pi}{M}(m-1)(l-n),$$

for $n \leq l \leq (n+M-1)$, or $$\frac{2\pi}{kM}(m-1)(l-M-n+n'+1),$$

for $n+M \leq l \leq (n+N-1)$, where k and n' are integers which satisfy the following expressions:

$$(k-1)M+1 \leq N \leq kM$$

and $$n'(k-1) < (l-M-n+1) \leq (n'+1)(k-1).$$

10. The method of claim 1 furthering comprising the step of processing a plurality of symbols with an interleaver.

11. The method of claim 1 furthering comprising the step of processing a symbol with a constellation mapper.

12. The method of claim 11 wherein the constellation mapper comprises a DPSK constellation mapper.

13. The method of claim 11 wherein the constellation mapper comprises a PSK constellation mapper.

14. A transmitter for a wireless communication system for transmitting signals to a receiver, the transmitter comprising:

a channel coder for receiving a digital information signal and producing one or more symbols based on said digital information signal;

a plurality of M information symbol weighting means, coupled to the channel coder, each such means for weighting a symbol with a distinct time varying function;

a plurality of M antennas, each coupled to a symbol weighting means, for transmitting substantially simultaneously M signals based on weighted symbols.

15. The transmitter of claim 14 wherein the signals for transmission to a receiver are provided to the transmitter by an information source comprising a telephone network.

16. The transmitter of claim 14 wherein the channel coder comprises a convolutional channel coder.

17. The transmitter of claim 14 wherein the channel coder comprises a block code channel coder.

18. The transmitter of claim 14 wherein one or more of the M information symbol weighting means comprise a multiplier applying the distinct time varying function.

19. The transmitter of claim 14 wherein the time varying function provides a phase shift to a symbol.

20. The transmitter of claim 14 wherein the distinct time varying function provides an amplitude gain to a symbol.

21. The transmitter of claim 14 further comprising a constellation mapper, coupled to receive symbols and to provide mapped symbols to the plurality of weighting means.

22. The transmitter of claim 21 wherein the constellation mapper comprises a PSK constellation mapper.

23. The transmitter of claim 21 wherein the constellation mapper comprises a DPSK constellation mapper.

24. The transmitter of claim 14 further comprising an interleaver, coupled to the channel coder, for producing a plurality of interleaved symbols.

25. A method of transmitting digital signal information to a receiver with use of a plurality of antennas, the method comprising the steps of:

applying a channel code to a digital signal to produce one or more symbols;

forming one or more copies of a symbol;

phase-shifting one or more copies of the symbol based on a distinct time varying function to form one or more phase-shifted symbol copes; and substantially simultaneously transmitting a plurality of signals each with a different antenna, one or more transmitted signal reflecting a phase-shifted symbol copy and zero or more transmitted signals reflecting copies of a symbol which are not phase-shifted based on a distinct time varying function.

26. The method of claim 25 wherein the step of applying a channel code comprises the step of applying a convolutional code.

27. The method of claim 25 wherein the step of applying a channel code comprises the step of applying a block code.

28. A transmitter for a wireless communication system for transmitting signals to a receiver, the transmitter comprising:

a channel coder for receiving a digital information signal and producing one or more symbols based on said digital information signal;

a plurality of information symbol phase-shifting means, coupled to the channel coder, each such means for phase-shifting a symbol in accordance with a distinct time varying function; and a plurality of antennas for substantially simultaneously transmitting a plurality of signals, one or more transmitted signals reflecting a phase-shifted symbol copy and zero or more transmitted signals reflecting copies of a symbol which are not phase-shifted based on a distinct time varying function.

29. The transmitter of claim 28 wherein the signals for transmission to a receiver are provided to the transmitter by an information source comprising a telephone network.

30. The transmitter of claim 28 wherein the channel coder comprises a convolutional channel coder.

31. The transmitter of claim 28 wherein the channel coder comprises a block code channel coder.

32. The transmitter of claim 28 wherein one or more of the symbol phase-shifting means comprise a multiplier applying the time varying function.

33. The transmitter of claim 28 further comprising a constellation mapper, coupled to receive symbols and to provide mapped symbols to the plurality of phase-shifting means.

34. The transmitter of claim 28 further comprising an interleaver, coupled to the channel coder, for producing a plurality of interleaved symbols.

* * * * *